United States Patent [19]
Frank et al.

[11] Patent Number: 6,045,308
[45] Date of Patent: Apr. 4, 2000

[54] TOOL CARRIER

[75] Inventors: Peter Frank, Struth-Helmershof; Rudi Holland-Moritz, Steinbach-Hallenberg; Dietmar Kürschner, Grumbach, all of Germany; Magnus Aspeby, Rio de Janeiro, Brazil

[73] Assignee: Sandvik AB, Sandviken, Sweden

[21] Appl. No.: 09/008,626

[22] Filed: Jan. 16, 1998

[30] Foreign Application Priority Data

Jan. 17, 1997 [SE] Sweden ................................... 9700139

[51] Int. Cl.⁷ ....................................................... B23C 9/00
[52] U.S. Cl. ...................................... 409/234; 408/239 R
[58] Field of Search ................................... 409/232, 234; 408/143, 146, 147, 181, 238, 239

[56] References Cited

U.S. PATENT DOCUMENTS

| | | | |
|---|---|---|---|
| 4,955,767 | 9/1990 | Kaiser et al. | 408/146 |
| 5,033,923 | 7/1991 | Osawa | 409/234 X |
| 5,096,345 | 3/1992 | Toyomoto | 409/234 X |
| 5,125,777 | 6/1992 | Osawa | 409/234 |
| 5,263,995 | 11/1993 | Mogilnicki et al. | 408/143 X |
| 5,407,308 | 4/1995 | Takayoshi | 409/232 |
| 5,443,340 | 8/1995 | Reinauer et al. | |
| 5,462,293 | 10/1995 | Samelius et al. | 409/234 X |

FOREIGN PATENT DOCUMENTS 0061404  4/1982  Japan ..................................... 408/143

OTHER PUBLICATIONS

Änderungsdienst Document: Reference Document "DIN 69893" (07/1993; Nos. 69893–1–69893–6).

*Primary Examiner*—William Briggs
*Attorney, Agent, or Firm*—Burns, Doane, Swecker & Mathis, L.L.P.

[57] ABSTRACT

The invention relates to a tool carrier with a coupling end (2) arranged on the tool machine side and a tool holder (9) arranged on the tool side, a surface (16) with a radial projection being provided internally in the coupling end of the tool machine side, which surface is machineable through the opening of the coupling end of the tool machine side. In said surface (16) is/are provided one or several borings (15) for a static and dynamic balancing of the tool machine side coupling end (2) of the tool carrier. Inter alia, this can provide both a static and a dynamic balancing.

9 Claims, 3 Drawing Sheets

TOOL CARRIER

The present invention relates to a carrier for a co-rotative and axially stable fixing of tool components on carrier parts provided for this purpose, such as for instance on a tool carrier or a tool basic holder. In particular, the invention relates to the balancing of such rotating tool carriers, in accordance with the preamble of claim 1.

Particularly in view of the fact that modern manufacturing plants are increasingly equipped with automatic tool changing systems, the demand for automatic changeable tool systems has become more and more important. In such systems, e.g., a tool shank, which has been produced with large precision, of a tool carrier, is used, to which tool shank a system of different tools may be connected. High demands are made on such a coupling system in relation to the direction of forces and radial run-outs, and positioning and balancing accuracy.

Several attempts have already been made to create a universally applicable coupling system that fulfils the above mentioned criteria. It has for instance been suggested to use a self-centering Hirth serration in the coupling region, which serration together with a collet shall guarantee a shape-accurate connection of the parts. According to a further suggestion, the coupling is realized over a centrical thread joint.

A very efficient coupling for the region of the boundary between tool machine and tool system module is disclosed in German Disclosure No. 69893 and also in DE-A-3 807 140, corresponding to U.S. Pat. No. 5,443,340. This type of couplings is usually called "HSK", which is a German abbreviation for "Hohlschaftkegel" or hollow shank taper, that has been more and more accepted as a tool boundary. The HSK is a coupling device between a tool system module, e.g., a tool holder, and a tool machine, for instance a spindle. For a quick attaching and detaching of the joint between these two components, under the provision of large axial forces, a clamping arrangement with an actuation bar is foreseen, by which a wedge gear device is activated, by which device clamping elements provided in one of the parts to be coupled may be pressed substantially radially outwards, into correspondingly shaped recesses in the other part to be coupled. The clamping elements are formed of at least three clamp-like clamping claws that are arranged at equal angular distances from each other, which claws are arranged substantially parallel to a centering extension of the tool holder and are pivotable in a groove-shaped recess of the centering extension, relative to a claw part that is located radially within the centering extension in the coupled state, while said claws are being supported in a centering holder of the spindle.

The substantial characteristic of the HSK coupling is the conical shape of the hollow taper, with a planar abutment surface according to the above mentioned DIN 69893. The most important advantages with this construction is a high static and dynamic stiffness, a high torque transfer, a defined radial and axial positioning and a good high speed performance. However, a disadvantage is that the coupling is not entirely rotation-symmetrical and this fact makes necessary a conterbalancing. At high rotation speeds, such as up to 30 000 rpm, also other unbalance problems become more important, viz. the so called dynamic unbalance. A not moving rotation body may be counterbalanced at places that are axially displaced from the source of the unbalance, but when the same body rotates, then axially displaced centrifugal force differences arise, which lead to a moment unbalance. At high rotation speeds, this may lead to undesired rotation vibrations.

It is known to provide balancing borings on the outside of the tool carrier part of HSK tool holders. This solution is not fully satisfactory because the open exposure of the balancing borings may be conspicuous and disturbing. Moreover, axially they are relatively widely distanced from the asymmetry of the HSK coupling on the machine spindle side and this brings about a dynamic unbalance.

Thus, the object of the present invention is to provide a tool carrier that is balanced statically as well as dynamically.

A further object of the invention is to provide a balancing that is as unexposed as possible.

Yet another object of the invention is to provide a balancing of the tool carrier that is as definite as possible and that does not require any further improvements before each operation.

These objects are achieved by the features of the characterizing clause of claim 1.

Advantageous embodiments are defined in the dependent claims.

In the following, the invention is described in more detail with reference to the appended drawings. These are:

Figure 1:
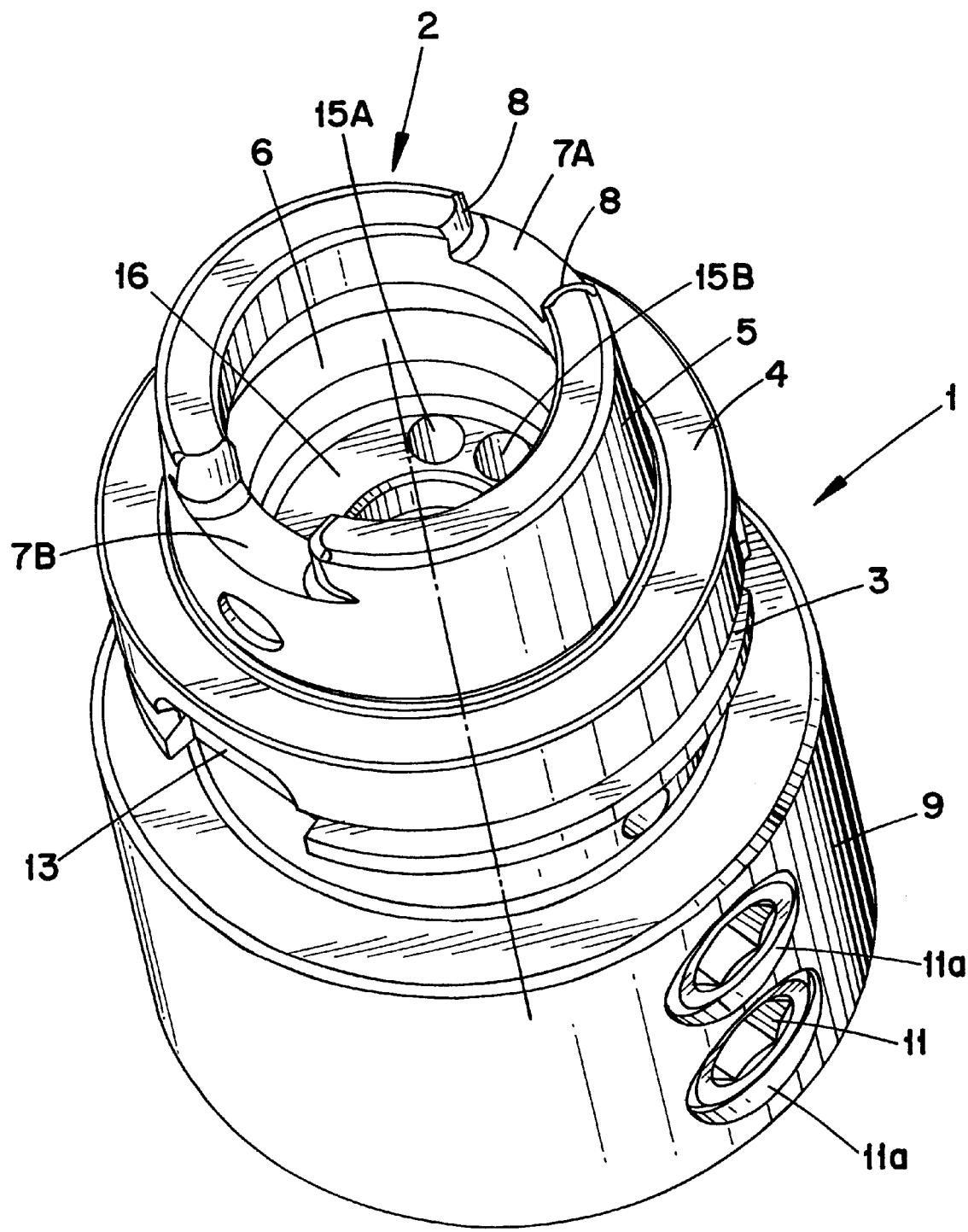
FIG. 1 shows a perspective view of the tool system module in the shape of a tool holder.
Figure 2:
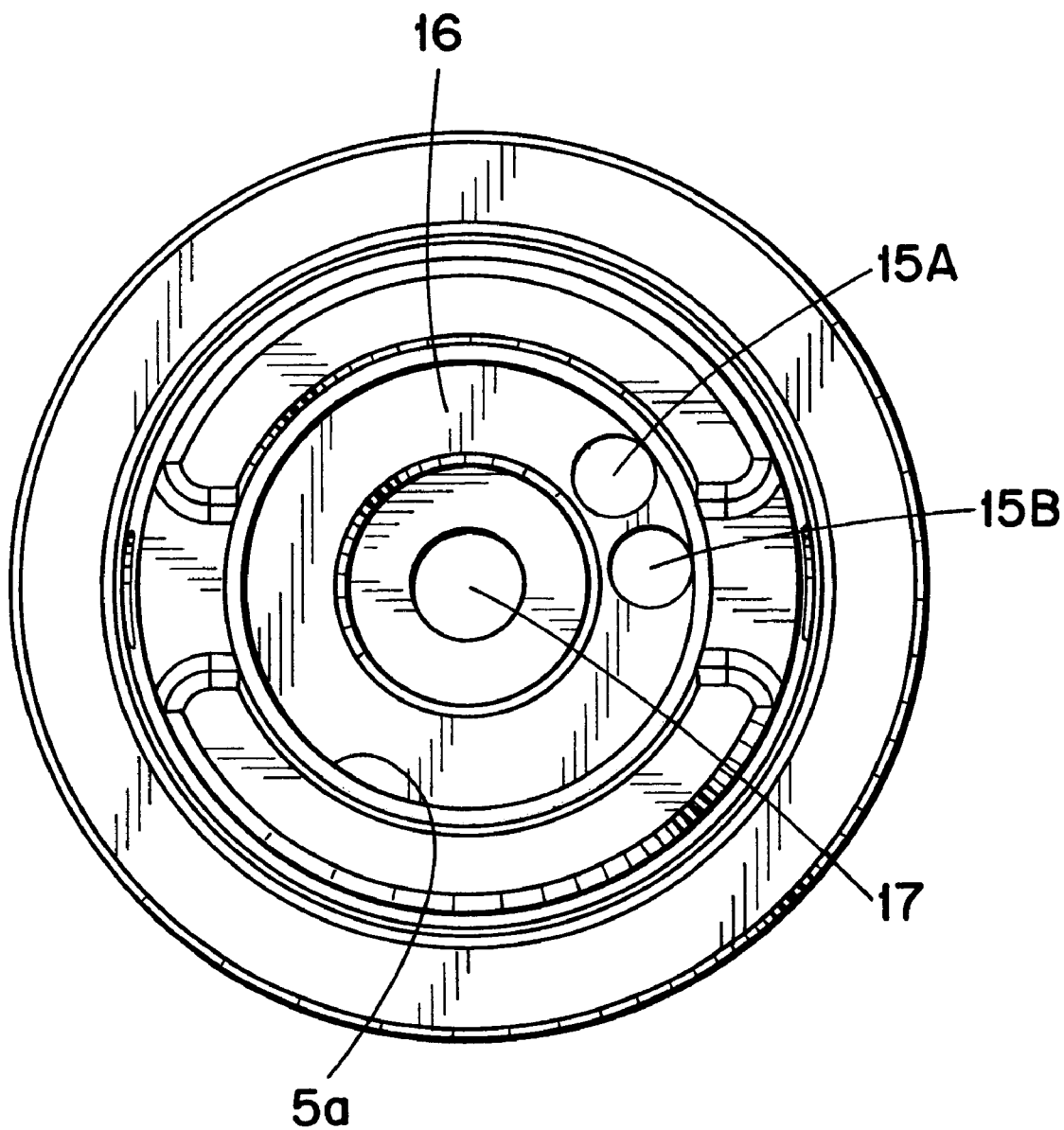
FIG. 2 shows a frontal view of the tool holder according to FIG. 1.

In FIG. 1, reference numeral 1 designates a tool system module, e.g., a tool holder, that is to be coupled by means of the hollow shank taper or axial spacing 5a of a coupling end 2 onto a tool machine spindle. In order to make possible an automatic exchange of the tool system module, this has a gripper groove 3 that can be manufactured in a conventional manner. The basic holder 1 has a radial ring surface 4 and a centering surface 5, which are provided on the outer side of a centering taper. Cooperating surfaces are provided on the spindle, corresponding to the surfaces 4 and 5. Clamp elements known per se may be pivoted with their claw portions into a groove-shaped, annular recess 6 in the hole of the centering cone, thereby providing an axially directed pressing force between the tool holder and the spindle.

For the transfer of torque between the spindle and the tool system module, a claw serration or a wedge device is provided, more specifically two diametrically opposed carrier grooves 7A, 7B are provided in the centering taper, so that two mating surfaces 8 are created at each groove 7. Into these groove-like recesses engage correspondingly shaped carrier claws or wedges. In order to achieve a distinctly defined position and to avoid an 180° dislocation, the two carrier grooves are differently deep. Therefore, as may be seen in FIG. 1, recess 7B is deeper than recess 7A. Of course, these differing recesses cause an unbalance.

Furthermore, two diametrically opposed recesses 13 are provided along the grip groove 3. These recesses function as indexating or orienting surfaces for the gripprt arm for automatic tool changing. In order to avoid an 180° dislocation of the tool holder, the two recesses 13 are again somewhat differently shaped, and this again amounts to a source of unbalance.

A further unbalance-causing detail is the positioning marks for a tool magazine for automatic tool changing, namely the positioning groove 14.

Figure 3:
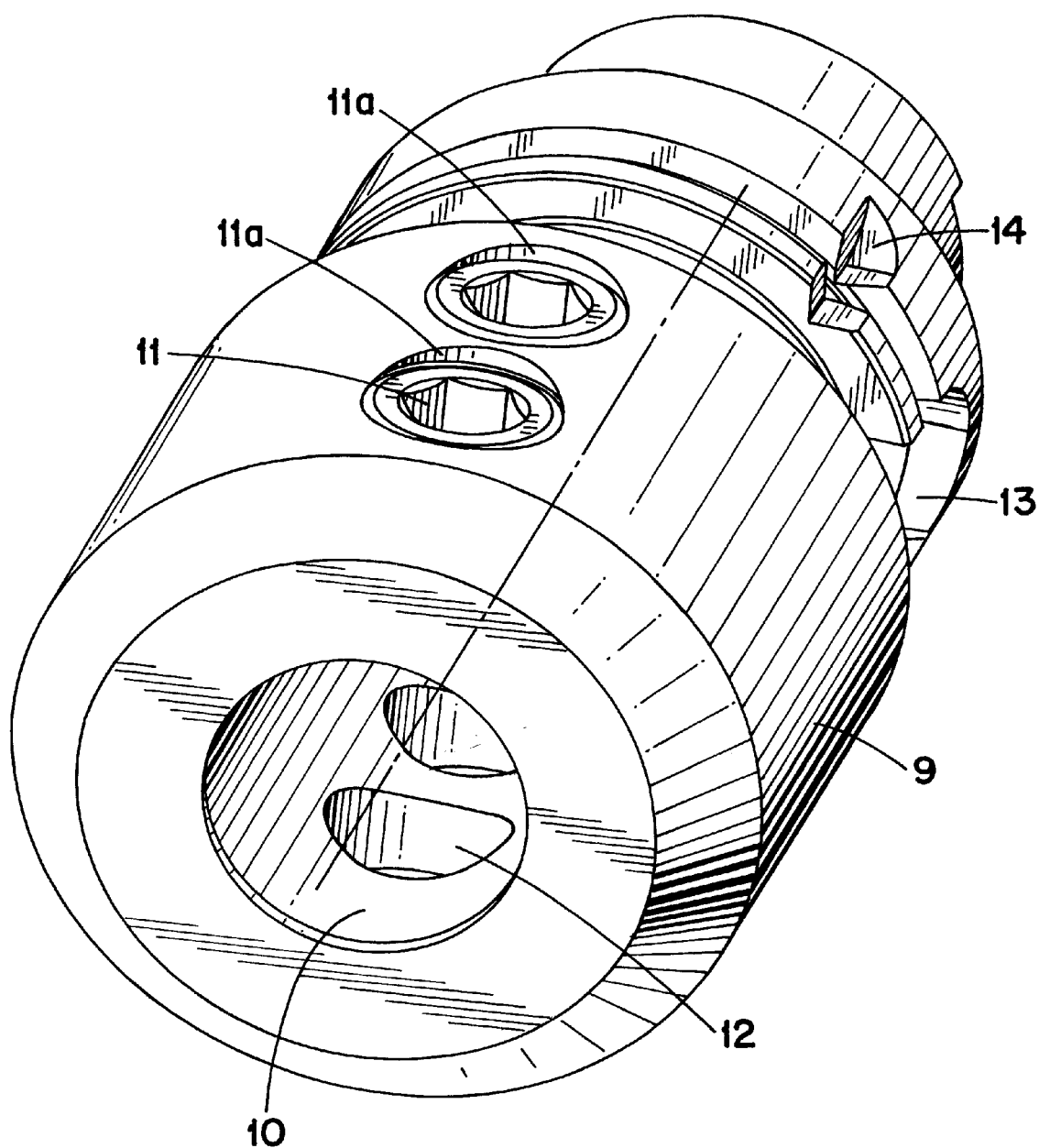
FIG. 3 shows a further perspective view of the tool holder according to FIG. 1.

The end of the tool system module 1 opposite to the tool machine is a tool holder 9. Of course, the shape of this holder depends on which tool or tool module system is to be gripped. This may for instance be a holder for external and internal turning tools, a holder in the form of an hydraulic chuck, a collet holder, a holder with a polygon profile according to the so called Sandvik Capto (registered trademark), or a so called Wistle Notch holder 9, as shown in FIGS. 1 and 3. This holder comprises a cylindrical cavity 10, into which for instance a tool with a cylindrical tool shank with an inclined clamping surface may be introduced. The introduced part may be fastened by two clamping screws 11.

In view of the above, it is absolutely clear that there are several sources of unbalance. Therefore, at the high rotation speeds, which are more and more used today, the tool carriers have to be counterbalanced, statically as well as dynamically.

The essential feature of the present invention is the existence of one or several borings 15A, 15B on the inside of the tool machine side coupling 2 of the tool carrier 1. These borings are made on a forwardly facing radial end surface 16, that may be reached through the spindle-side opening of the hollow shank cone, and which is situated axially in the immediate proximity of/or between the sources of unbalance of the tool machine side holder, theses sources of unbalance in the present case being present radially on the same side of the tool holder. However, this does not have to be the case and the sources of unbalance may be located with any radial angle between them.

In order to eliminate the sources of unbalance in the tool side holder 9, which sources are to be found in the threaded borings 11a for the clamping screws 11, the borings 12 are, according to a preferred embodiment of the invention, provided radially opposed but axially on the same level as said threaded borings 11a. Together, the borings 12, 15A and 15B serve to counterbalance the entire tool carrier, statically as well as dynamically. The fact that the borings 12, 15A and 15B, respectively, also bring about a dynamic balancing, is explained by the fact that the borings 15A and 15B are located in the immediate proximity of two sources of unbalance, namely on one hand of the asymmetric carrier grooves 7, and on the other hand of the recesses 13, 14, and that the sources of unbalance 11a of the tool holding part 9 caused on the tool side are at the level of the borings 12. Alternatively, the borings 15A and 15B may be situated axially between the carrier grooves 7 and the recesses 13 (and the positioning groove, respectively), whereby an even better dynamic balancing of these sources of unbalance is attained. (The fact that the borings also provide a static balancing for both these sources of unbalance is clear, anyway). Depending on the tool carrier, the borings 15A and 15B are exactly defined relative to position, depth and diameter. If so desired, one or several borings could later be partly or entirely refilled with a mass, e.g., with a plastic mass, or aluminum or tin.

Preferably, a through hole 17 is provided in the center of the tool carrier, which hole is primarily intended for a cooling medium.

We claim:

1. A tool carrier defining a center axis extending through front and rear ends thereof, the tool carrier defining a center axis including a holder portion disposed at the rear end for attaching the tool carrier to a tool machine, and a coupling portion disposed at the front end, the coupling portion including an axial opening adapted to receive a tool, an interior of the opening extending rearwardly to a generally forwardly facing end surface, at least one balancing bore being formed in the end surface at a location offset radially from the center axis for statically and dynamically balancing the coupling portion.

2. The tool carrier according to claim 1 wherein the carrier includes at least two axially spaced sources of imbalance in the coupling portion, the at least one balancing bore disposed axially between the axially spaced sources of imbalance.

3. The tool carrier according to claim 1 wherein the end surface is substantially radially oriented.

4. The tool carrier according to claim 1 wherein the tool carrier includes an outer surface having recesses formed therein adapted to receive a gripper arm, the recesses disposed at the same axial level of the carrier, the at least one balancing bore being disposed at generally the same axial level as the recesses.

5. The tool carrier according to claim 1 wherein the holder portion includes a source of imbalance, the tool carrier further including at least one additional balance bore situated at substantially the same axial level as the source of imbalance of the holder portion.

6. The tool carrier according to claim 5 wherein the at least one additional balance bore extends radially.

7. The tool carrier according to claim 6 wherein the at least one balance bore formed in the end surface extends axially.

8. The tool carrier according to claim 1 wherein the at least one balancing bore is empty.

9. The tool carrier according to claim 1 wherein the at least one balancing bore contains a substance of lighter weight than a material from which the carrier is formed.

* * * * *